B. F. KNOBLOCH.
ATTACHING DEVICE FOR NON-SKID CHAINS.
APPLICATION FILED JUNE 26, 1918.
1,289,194.
Patented Dec. 31, 1918.
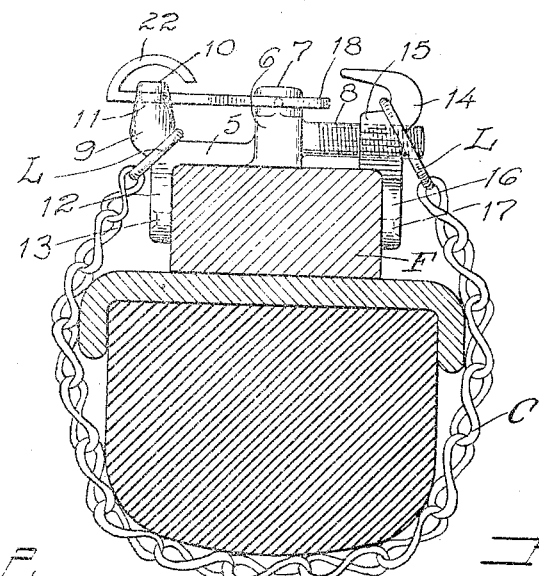
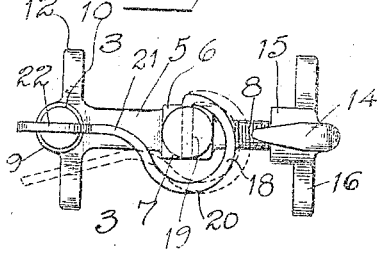
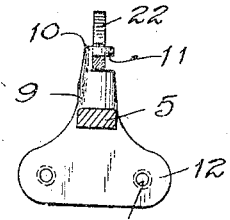
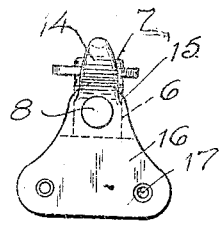
Inventor
Barney F. Knobloch
By Watson E. Coleman
Attorney

UNITED STATES PATENT OFFICE.

BARNEY F. KNOBLOCH, OF PITTSBURGH, PENNSYLVANIA.

ATTACHING DEVICE FOR NON-SKID CHAINS.

1,289,194.

Specification of Letters Patent. Patented Dec. 31, 1918.

Application filed June 26, 1918. Serial No. 241,948.

*To all whom it may concern:*

Be it known that I, BARNEY F. KNOBLOCH, a citizen of the United States, residing at Pittsburgh, in the county of Allegheny and State of Pennsylvania, have invented certain new and useful Improvements in Attaching Devices for Non-Skid Chains, of which the following is a specification, reference being had to the accompanying drawings.

This invention relates to an attaching device for non-skid chains, and has for its primary object to provide certain improvements in my original invention as shown and described in application Serial No, 218,535, filed February 21, 1918, whereby the durability and general efficiency of the device in practical use will be materially enhanced.

It is a more particular object of the invention to provide a device for the above purpose embodying spaced attaching hooks for the terminal links of the chain, and a simplified and improved form of latch element to coact with one of the lugs to prevent the casual disengagement of the chain link therefrom.

As a specific item of improvement in my original invention above referred to, I contemplate the provision of a one-piece resilient latch element suitably fixed at one of its ends to the body of the attachment, one of the link receiving lugs being notched or slotted in one side to receive the free end of said latch element, and said element being provided with terminal means whereby it may be conveniently manipulated and engaged in said slot or disengaged therefrom.

And it is a further general object of the invention to provide an attaching device for non-skid chains whereby the chains may be very easily and quickly applied to or removed from the tire of a vehicle wheel, the device as a whole being of exceedingly simple construction, not liable to get out of order, and capable of manufacture at comparatively small cost.

With the above and other objects in view, the invention consists in the improved construction, combination and relative arrangement of the several parts as will be hereinafter more fully described, subsequently claimed and illustrated in the accompanying drawing in which similar reference characters designate corresponding parts throughout the several views, and wherein:—

Figure 1 is a transverse sectional view through the tire and felly of a vehicle wheel, illustrating one embodiment of the invention and showing the tread chain applied to the wheel tire;

Fig. 2 is a plan view of the attachment, the latch element being illustrated in dotted lines in its released position;

Fig. 3 is a sectional view taken on the line 3—3 of Fig. 2; and

Fig. 4 is an end elevation.

Referring in detail to the drawing, 5 designates the body bar, which is generally of rectangular form and may be of any desired width and thickness. Upon one end of this bar, an angularly disposed rectangular post 6 is integrally formed and is provided with a cylindrical terminal, indicated at 7. A threaded rod 8 is also integrally formed with one side of the post 6 and extends longitudinally therefrom in a plane parallel to the plane of the body bar 5.

Upon the other end of the bar 5, a cylindrical lug 9 is formed, said lug preferably being provided with a reduced end portion 10. In one side of this reduced end portion of the lug 9, a transversely extending slot or recess 11 is formed, said slot preferably being of a depth slightly exceeding the diameter of the reduced end of said lug. This end of the body bar 5 is likewise formed with an attaching plate 12 extending from the opposite side of the bar with respect to the lug 9. This plate is formed with spaced screw receiving openings 13, whereby it may be securely attached to one side of the wheel felly, indicated at F.

In conjunction with the cylindrical lug 9, a hook-shaped lug 14 is employed, said lug projecting from one side of an interiorly threaded boss 15, which is adjustably engaged upon the threaded rod 8. An attaching plate 16 for the hook 14 is integrally formed with the upper side of the boss 15 and is likewise provided with screw receiving openings 17 whereby said plate may be securely fixed to the opposite side face of the wheel felly. It will be noted that the bill of the hook 14 projects inwardly toward the post 6 on the body bar 5, and the boss 15 is of such diameter that it engages over the inner face of the wheel felly. It will, of course, be understood that in the application of the device, the plate 16 which is provided with the lug 14 is first adjusted on the threaded rod 8 until said plate is properly spaced from the plate 12 in accordance with the width of the wheel felly. The plates 12 and 16 are then engaged upon opposite sides of the felly and securely fixed thereto in the manner above explained.

C designates a conventional type of non-skid tire chain and this chain is provided with terminal links L adapted to be respectively engaged with the cylindrical lug 9 and with the hook-shaped lug 14. In order to retain the chain in its applied position in connection with the lugs of the attaching device, I have devised a very simple latch means, which I will now proceed to describe in detail.

A single rod 18 of resilient steel or other suitable metal has one of its ends engaged through a transverse opening in the cylindrical end 7 of the post 6, as shown at 19, and permanently fixed in said post. This resilient rod is curved from its fixed end, as at 20 and extended to a point at one side of the post 6 in spaced relation thereto. The free end of the resilient latch rod, designated by the numeral 21, is longitudinally extended and this end portion, as well as the curved portion 20 of said rod, is disposed in a plane in parallel relation to the body bar 5. The end portion 21 terminates in a curved finger piece 22 extending inwardly and disposed in a plane at right angles to the plane of said rod.

In applying the chain to the wheel tire after the terminal links L have been engaged over the cylindrical lug 9 and the hook-shaped lugs 14, the resilient latch rod is moved from the dotted line position seen in Fig. 2 of the drawing toward the lug 9 and is sprung laterally over the reduced end of said lug to a position at the opposite side thereof. Upon the release of the rod, its free end will immediately spring outwardly and tend to return to its normal position so that it will enter the slot or recess 11 in the side of said lug and firmly seat against the base wall thereof. Thus, the chain link is retained upon the lug 9 and all possibility of its accidental disengagement therefrom is obviated. When it is desired to detach and remove the tread chain, the finger extension 22 is firmly grasped and the free end of the latch rod sprung out of the slot 11 and then over the end of the lug 9 so that it may return to its normal position, as shown in dotted lines. Thus, it is not necessary to hold the latch against a return movement and the free end of the latch rod is entirely out of the way so that the terminal link of the chain can be readily disengaged from the attaching lug.

From the foregoing description, taken in connection with the accompanying drawing, the construction, manner of operation and several advantages of my invention will be clearly and fully understood. It will be appreciated that I have materially improved the device as shown in my prior application above referred to and also greatly increased the durability and serviceability thereof by simplifying the latch construction in the manner described. This latch device, however, I have found to be very efficient and reliable in practical use and capable of effectually resisting casual shocks or jars which might have a tendency to disengage the latch from the attaching lug and release the chain. It is also apparent that the device in its improved form can be manufactured and sold at relatively small cost.

While I have herein shown and described the preferred construction and arrangement of the various elements employed, it is to be understood that the device is susceptible of considerable modification and I, therefore, reserve the privilege of adopting all such legitimate changes as may be fairly embodied within the spirit and scope of the invention as claimed.

I claim:—

1. An attaching device for non-skid chains comprising a body bar adapted to be secured upon the inner face of a wheel felly, said bar having lugs at its opposite ends with which the terminal links of a tread chain are adapted to be engaged, one of said lugs being provided in one side thereof with a slot, and a resilient latch element fixed at one of its ends to the bar and extending in parallel relation to the plane thereof, said latch element at its free end being adapted for engagement in said slot to retain the chain link in connection with the lug.

2. An attaching device for non-skid chains comprising a body bar adapted to be secured upon the inner face of a wheel felly, said bar having lugs at its opposite ends with which the terminal links of a tread chain are adapted to be engaged, one of said lugs being provided in one side thereof with a slot, and a resilient latch rod fixed at one of its ends to the body bar, the free end of said rod being normally disposed in angular relation to the plane of the body bar in spaced relation to said slotted lug, said free end of the latch rod adapted to be sprung over the end of said lug and engaged in the slot thereof to retain the chain link in connection with the lug.

3. An attaching device for non-skid chains comprising a body bar adapted to be secured upon the inner face of a wheel felly, said bar having lugs at its opposite ends with which the terminal links of a tread chain are adapted to be engaged, one of said lugs having a slot in one side thereof, and a resilient latch rod having one end fixed to the body bar and extending transversely thereof, said latch rod having a curved portion extending from its fixed end, the opposite end of the rod being normally disposed by the inherent resiliency of said curved portion in spaced relation to said lug and adapted to be sprung over the lug and engaged in the slot thereof to retain the chain link in connection with the lug.

4. An attaching device for non-skid chains comprising a body bar adapted to be secured upon the inner face of a wheel felly, said bar having lugs at its opposite ends with which the terminal links of a tread chain are adapted to be engaged, one of said lugs having a slot in one side thereof, said body bar being further provided with an angularly disposed post between the link engaging lugs, and a resilient latch rod having one of its ends extending transversely through said post and fixed therein, said rod being curved around the post and having an extended free end normally disposed in spaced relation to the slotted lug, said free end of the latch rod being adapted to be sprung over the end of said lug and engaged in the slot thereof to retain the chain link in connection with the lug.

5. An attaching device for non-skid chains comprising a body bar adapted to be secured upon the inner face of a wheel felly, said bar having lugs at its opposite ends with which the terminal links of a tread chain are adapted to be engaged, one of said lugs having a slot in one side thereof, said body bar being further provided with an angularly disposed post between the link engaging lugs, and a resilient latch rod having one of its ends extending transversely through said post and fixed therein, said rod being curved around the post and having an extended free end normally disposed in spaced relation to the slotted lug, said free end of the latch rod being adapted to be sprung over the end of said lug and engaged in the slot thereof to retain the chain link in connection with the lug, the said free end of the latch rod being formed with an inwardly curved terminal disposed in a plane at right angles to the plane of said rod.

In testimony whereof I hereunto affix my signature in the presence of two witnesses.

BARNEY F. KNOBLOCH.

Witnesses:
T. W. SIEBERT,
SAMUEL KHOLER.